UNITED STATES PATENT OFFICE.

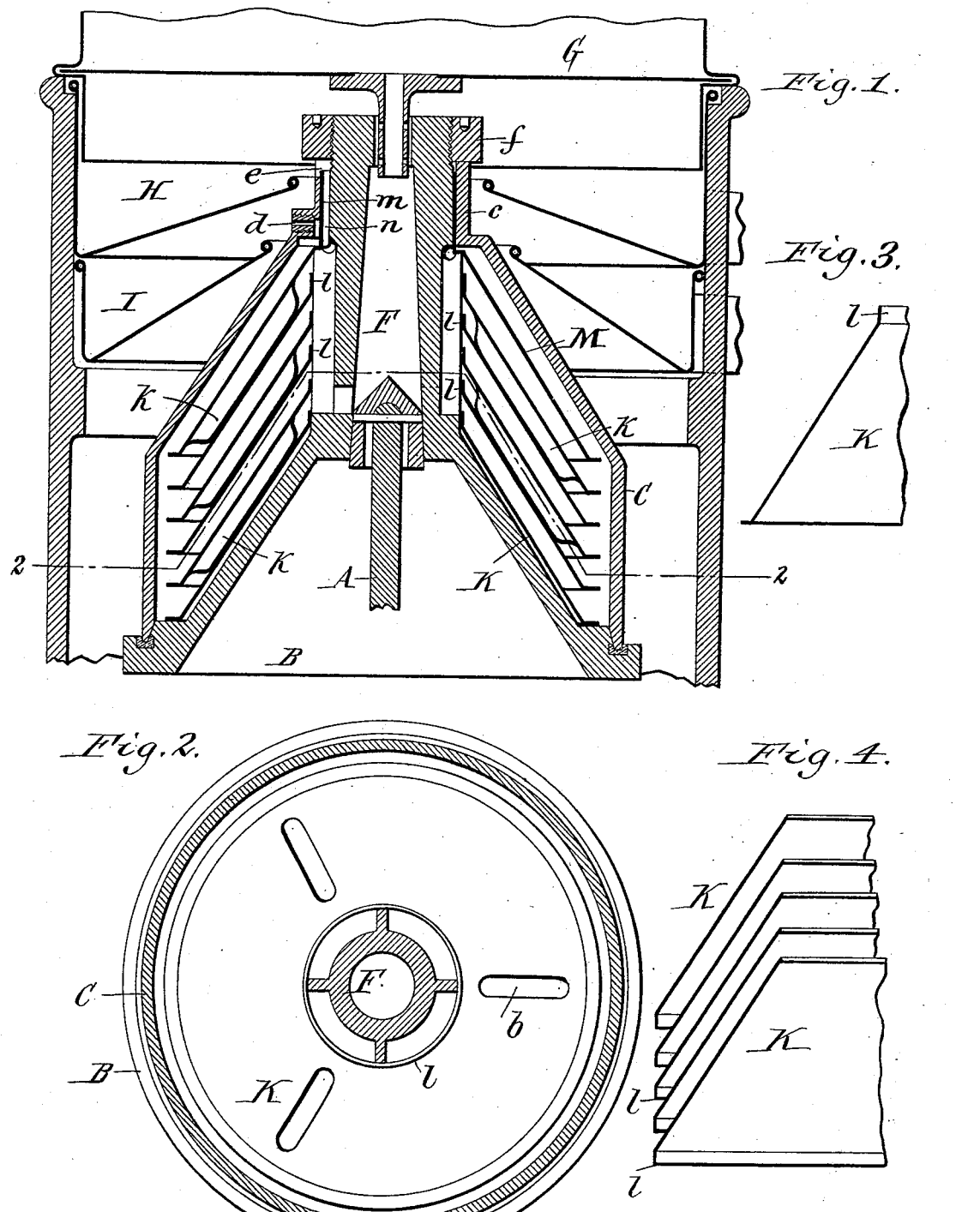

JOHAN LUDVIG JÖNSSON, OF STOCKHOLM, SWEDEN, ASSIGNOR TO THE AKTIEBOLAGET SEPARATOR, OF SAME PLACE.

CENTRIFUGAL LIQUID-SEPARATOR.

SPECIFICATION forming part of Letters Patent No. 519,085, dated May 1, 1894.

Application filed June 30, 1893. Serial No. 479,216. (No model.)

*To all whom it may concern:*

Be it known that I, JOHAN LUDVIG JÖNSSON, a subject of the King of Sweden and Norway, residing at Stockholm, Sweden, have invented new and useful Improvements in Centrifugal Liquid-Separators, of which the following is a specification.

This invention relates to that class of centrifugal liquid separators in which the bowl or drum is provided in its liquid space with division rings or cones by which the body of liquid is divided into layers, for instance, as described in Letters Patent of the United States No. 432,719, dated July 22, 1890. In machines of this class the lower rings or cones, which are nearest the point at which the full milk is introduced into the bowl, receive most of the full milk and effect proportionately a greater part of the separation than the upper rings which are more remote from that point.

The object of this invention is to increase the separating capacity of this class of machines by distributing the full milk more evenly between the several division rings or cones.

In the accompanying drawings:—Figure 1 is a sectional elevation of a centrifugal liquid separator provided with my improvements. Fig. 2 is a horizontal section in line 2—2, Fig. 1. Fig. 3 is a fragmentary sectional elevation of one of the division rings. Fig. 4 is a fragmentary vertical section of the division rings, showing a modified construction of the latter.

Like letters of reference refer to like parts in the several figures.

A represents the spindle, B the bottom of the bowl mounted thereon and C the peripheral wall of the bowl contracted upwardly to a neck $c$ in which are arranged the outlet $d$ for the skim milk, and the outlet $e$ for the cream. F represents a central feed pipe which is formed with or secured to the bottom of the bowl and extends upwardly through the neck $c$, where it is provided with an external screw thread to which a nut $f$ is applied. This nut bears upon the neck and holds the peripheral wall down upon the bottom. G represents the feed receptacle provided with a feed pipe which depends into the rotating feed pipe F. H and I represent, respectively, the receptacles for the cream and skim milk. All of these parts may be of any ordinary or suitable construction.

K represents the division rings or cones arranged one above the other in the liquid space of the bowl and held at a suitable distance apart by spacing ribs $k$ or other suitable means. These rings are provided with annular flanges or collars $l$ which project partially across the flow spaces, between the rings, and obstruct or restrict the same, either at the inner edges of the rings, as represented in Figs. 1, 2, and 3, which construction is preferred, or at their outer edges, as represented in Fig. 4. These obstructions in the flow spaces between the rings or cones retard the flow of the liquid between the same and compel the new milk to rise higher or travel farther along the series of rings or cones, than it would rise or travel in the absence of these obstructions and so compel the supply of new milk to distribute itself more uniformly from the inlet toward the outlet of the bowl. When these restraining collars are arranged at the inner ends of the rings or cones they also serve to deflect the cream moving inwardly along the outer surface of each ring or cone and enable part of the skim milk or milk serum which is mingled with this cream to become more completely separated from the cream globules before the cream escapes from the inner ends of the rings or cones. By this means the skimming capacity of the machine is largely increased, that is to say, the machine is enabled to skim a larger volume of new milk in a given time and the separation of the cream from the skim milk is rendered somewhat more perfect.

M represents the uppermost division ring or cone which is arranged nearest the tapering top portion of the peripheral wall of the bowl. This ring or cone is provided at its inner edge with an upwardly projecting collar $m$, slightly smaller in diameter than the collars of the lower rings or cones, and arranged between the outer surface of the rotating feed pipe F and the inner surface of the neck of the bowl, so that the separated cream moves upwardly through this collar. The outer surface of the rotating feed pipe F is slightly enlarged in diameter within this collar m and provided with an upright groove or channel n through which the cream passes to the cream outlet e.

I claim as my invention—

The combination with the bowl of a centrifugal liquid separator, of division rings or cones arranged in the liquid space of the bowl, said rings or cones being provided with annular flanges which project into and partially close the spaces between the rings or cones, substantially as set forth.

Witness my hand this 5th day of June, 1893.

JOHAN LUDVIG JÖNSSON.

Witnesses:
E. HAASE,
KLAS EKSTROM.